(12) United States Patent
Jäger

(10) Patent No.: US 6,167,769 B1
(45) Date of Patent: Jan. 2, 2001

(54) SCREW MECHANISM

(75) Inventor: Herbert Jäger, Sinsheim-Elsenz (DE)

(73) Assignee: Mapal Fabrik für Präzisionswerkzeuge (DE)

( * ) Notice: Under 35 U.S.C. 154(b), the term of this patent shall be extended for 0 days.

(21) Appl. No.: 09/289,567

(22) Filed: Apr. 9, 1999

(30) Foreign Application Priority Data

Apr. 9, 1998 (DE) .............................................. 198 15 966

(51) Int. Cl.[7] .................................................. F16H 27/02
(52) U.S. Cl. ..................... 74/89.15; 74/424.8 R
(58) Field of Search ............................ 74/89.15, 424.8 R

(56) References Cited

U.S. PATENT DOCUMENTS 5,601,121 * 2/1997 Bonacina ............................ 74/89.15
5,937,699 * 8/1999 Garrec .................................. 74/89.15

* cited by examiner

*Primary Examiner*—David Fenstermacher
(74) *Attorney, Agent, or Firm*—Ostrolenk, Faber, Gerb & Soffen, LLP

(57) ABSTRACT

A screw mechanism having a shaft which is guided in such a way that its reciprocating movement is converted at the output of the screw mechanism into a rotary movement. The shaft has a reciprocating rod and a round slide which are aligned axially with one another. At their mutually overlapping end regions, the reciprocating rod and the round slide respectively have guide surfaces which are of helical construction, run in the axial direction and are matched to one another in specular fashion. The round slide has an axial abutment of which limits the reciprocating movement of the round slide while the rotary movement is released. The reciprocating rod cooperates with a guide that prevents its rotation while permitting its reciprocation.

18 Claims, 5 Drawing Sheets

SCREW MECHANISM

BACKGROUND OF THE INVENTION

The present invention relates to a screw mechanism in which reciprocating movement of a shaft is converted into rotary movement at the output of the screw mechanism and particularly relates to the connection between the reciprocating shaft and a rotatable rod for producing rotary movement.

It is already known to provide a shaft with at least one helix on its outer surface and to insert the shaft into a sleeve having at least one corresponding driver. The shaft is mounted securely against rotation by means of a groove or a square and the shaft can be moved only axially. By contrast, the sleeve is secured against axial displacement and rotates about its central axis upon axial movement of the shaft. In this case, the transmissible torque depends essentially on the diameter of the shaft or sleeve. If it is a large diameter, the available torque is generally sufficient. However, matters become critical when the diameter becomes small and a relatively large torque nevertheless has to be made available. In many cases, the available torque is insufficient. Since the influence of friction also increases for relatively small shaft diameters, this can cause stoppage of the rotary movement of the sleeve and can thus cause operational failures.

SUMMARY OF THE INVENTION

It is an object of the present invention to provide a screw mechanism which produces sufficient torque even with the screw mechanism at small dimensions.

A screw mechanism of the invention includes a reciprocating rod, which does not rotate on its axis, coupled to a round slide which rotates but does not reciprocate, and which meet at the adjacent ends of each element through a helical connection. The screw mechanism is distinguished in that, at the round slide at the output of the screw mechanism, it is possible to tap a torque which is substantially greater than is obtainable with a known screw mechanism, even with a large stroke of the reciprocating rod because the transmission of force is performed from a reciprocating rod onto the round slide over elongate, axially extending, engaging guide surfaces, which are formed over relatively large overlapping contact surfaces of the engaging guide surfaces. It is particularly advantageous that the guide surfaces can be of relatively large or elongate construction even with a small shaft diameter, and thus it becomes possible to transmit a relatively large torque with a small shaft diameter.

In a preferred embodiment, the reciprocating rod has means with which the reciprocating rod is guided predominantly in the axial direction. This means can, for example, be a groove which runs in the axial direction and into the circumference of the reciprocating rod. As an alternative, it is also possible to provide a profiled edge along the rod. In this case, the reciprocating rod can be constructed as a four cornered shaft with a rectangular cross section, or the like. In order to increase the angle of rotation of the round slide, it has also proven favorable for the groove or profiled edge of the reciprocating rod to be constructed in the form of a helix running around and axially along the circumference of the reciprocating rod. If the helix is arranged in the sense of rotation of the round slide, the result is a substantially larger angle of rotation due to a stroke of the reciprocating rod than if the groove or profiled edge is axially parallel, since the reciprocating rod is simultaneously rotated in the direction of rotation during a stroke and the rotary movement of the round slide is supported and increased by the process.

It is also advantageous that the guiding groove is arranged on the reciprocating rod in the axial region of its guide surface. Consequently, the design for the reciprocating rod can be relatively short, with the result that the screw mechanism overall has a compact design.

In a further embodiment of the screw mechanism, an axial bore is provided in the reciprocating rod and the round slide. This axial bore has relatively little influence on the transmission of force. On the other hand, it is possible to insert a sliding rod in the bore, for example to stabilize the arrangement. A sleeve serving to guide the reciprocating rod and the round slide is then no longer required for the screw mechanism.

Alternatively, it is beneficial to arrange a spring, for example a return spring, in the bore, so that the rotary movement of the round slide is supported upon an oscillating stroke of the reciprocating rod.

Since the screw mechanism can be designed very compactly, for example as a cartridge, it is also possible to arrange a plurality of such screw mechanisms tightly next to one another in a tool. It is advantageous to construct screw mechanisms in an oppositely rotating fashion. An appropriate pin, preferably on the rotating disks of two round slides arranged next to one another, can limit the angle of rotation in a simple way.

Since the screw mechanism is finished in a very compact way owing to the short design, it is advantageously possible to use any drive sources. For example, the reciprocating rod is driven via a piston rod or is constructed directly as a piston which is driven by a pressure cylinder.

It is also regarded as favorable that the drive for the rotary movement can be freely selected. The screw mechanism can thereby be used universally.

Other features and advantages of the present invention will become apparent from the following description of the invention which refers to the accompanying drawings.

BRIEF DESCRIPTION OF THE DRAWINGS

The invention is explained in more detail below with the aid of drawings which represent several exemplary embodiments, and in which.

DETAILED DESCRIPTION OF THE INVENTION

Figure 1:
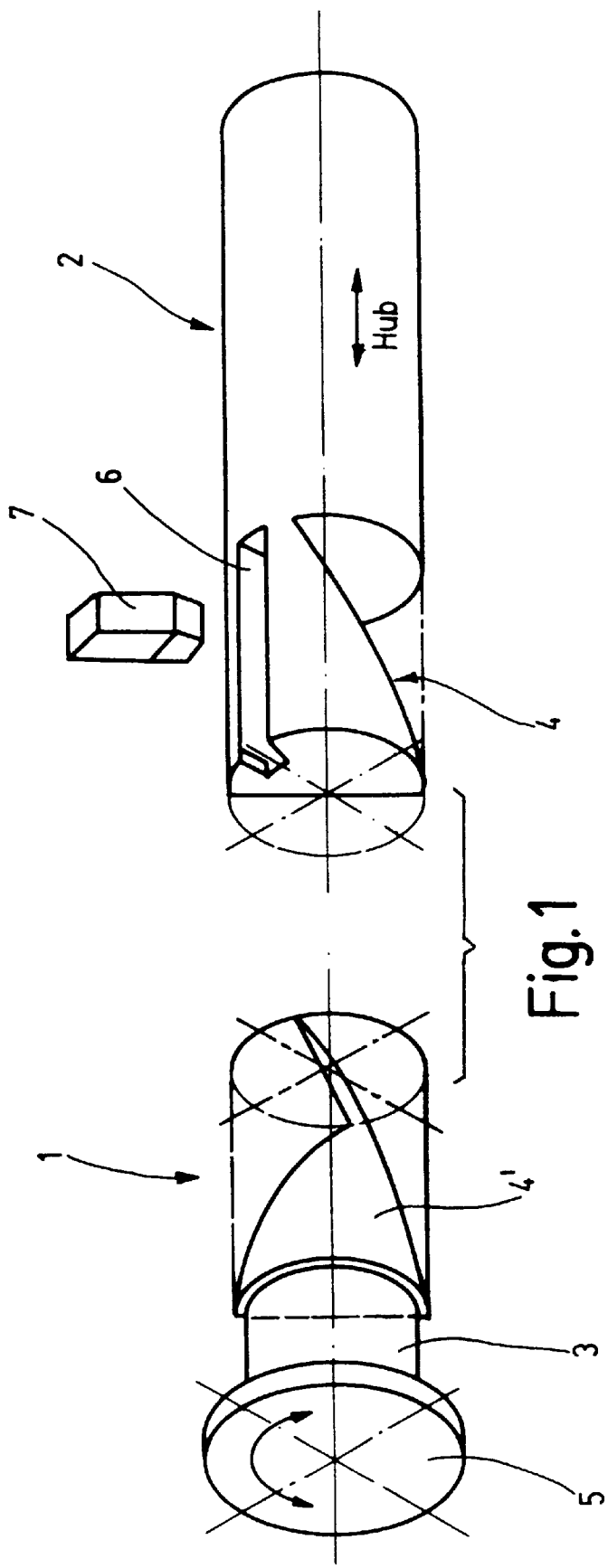
FIG. 1 shows a first embodiment in an exploded view with a rotationally fixed reciprocating rod and an axially fixed round slide.

In a first exemplary embodiment shown in FIG. 1, a screw mechanism is represented including a round slide 1 and a reciprocating rod 2 shown in an exploded view. The reciprocating rod 2 comprises a cylindrical shaft including a guide surface 4 at the left-hand end in the form of a helical incision approximately parallel to the longitudinal axis. The axial length of the guide surface 4 is determined considering the stroke of the reciprocating rod 2 and the desired angle of rotation desired of the round slide 1. A guide groove 6 extends in the longitudinal direction along the region of the guide surface 4. A fixed guide element 7, represented schematically, engages the groove 6 to produce the reciprocating movement of the reciprocating rod 2. Instead of the guide groove 6 and the engaged guide element 7, other suitable constructions may be used, for example a profiled edge or a shaft with a polygon as its cross-sectional surface. Further, the guide groove 6 and the guide element 7 may be displaced in the axial direction to be arranged at a distance from the guide surface 4.

The round slide 1 has a cylindrical base body which can be rotated about its central axis. At its left-hand end, a rotating disk 5 is provided from which torque can be tapped. There is a notch 3 in the base body, to the right of the rotating disk 5 in FIG. 1, in which an axial abutment (not shown) engages to prevent axial displacement of the round slide 1. On the other hand, the axial abutment is constructed to permit rotary movement of the round slide 1 or the rotating disk 5. A further guide surface 4' is arranged in an approximately mirror symmetric fashion relative to the guide surface 4 of the reciprocating rod 2 in the region of the right-hand end of the round slide 1. The two guide surfaces 4, 4' overlap one another, more or less, along the axial direction depending on the position of the reciprocating rod 2 during operation, to form a common contact surface through which force is transmitted from the reciprocating rod 2 to the round slide 1.

For completeness, in the assembled state, the round slide 1 and the reciprocating rod 2 are both inserted into a sleeve or a corresponding guide bore in order to absorb radial forces. That sleeve or bore have not been represented, for reasons of clarity.

Figure 2:
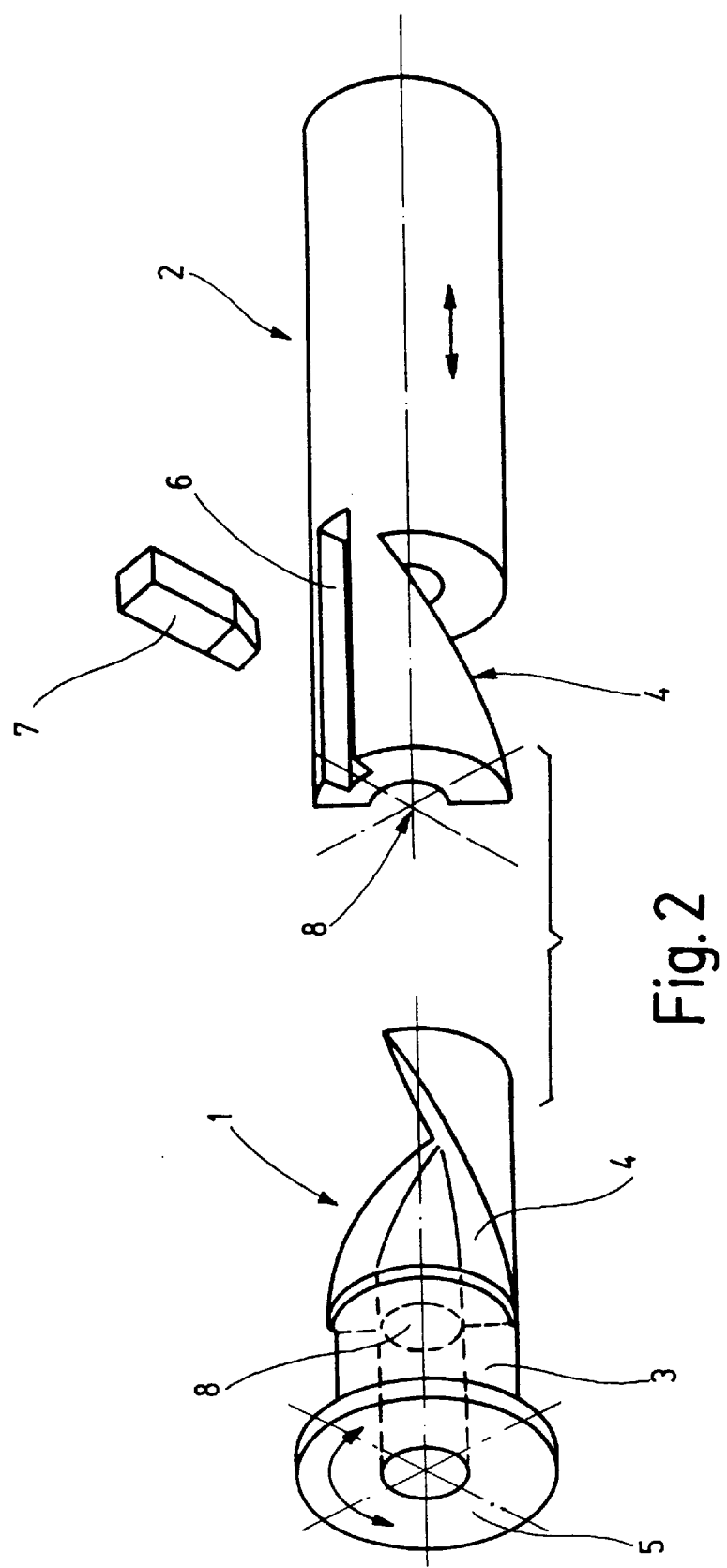
FIG. 2 shows a second embodiment with an axial bore.

FIG. 2 shows a second embodiment of the screw mechanism, which likewise comprises a reciprocating rod 2 and a round slide 1 as described for FIG. 1. FIG. 2 shows that the reciprocating rod 2 and the round slide 1 both have a bore 8 that runs concentric with the central axis. In order to stabilize the screw mechanism and to guide the reciprocating rod 2 and the round slide 1, for example, a spindle (not shown) may be inserted in the central bore 8. The transmission of force to the round slide is influenced only insubstantially by the central bore 8, since the surface load on the active contact surface of the two guide surfaces 4 is greater on the outside than near the axis. A surrounding sleeve is not required here, since the spindle offers sufficient stability and guidance for the arrangement.

Figure 3:
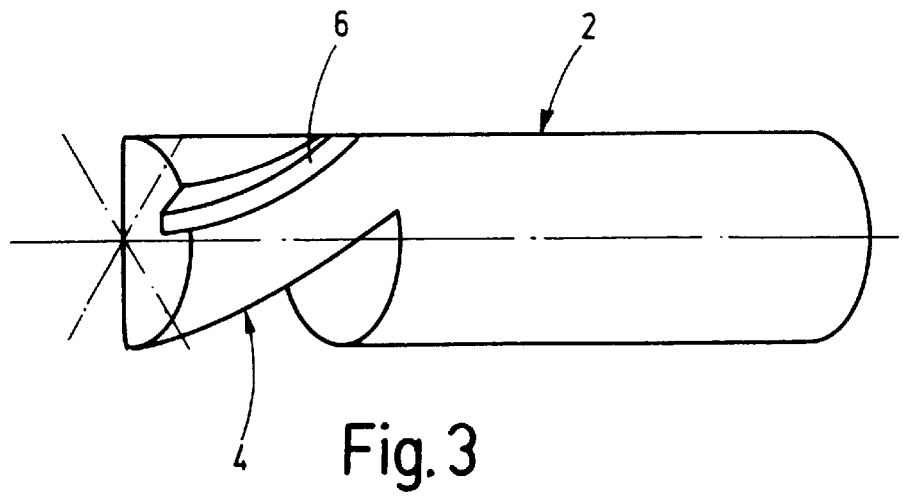
FIG. 3 shows a third embodiment, in which the reciprocating rod has a groove which is arranged helically on the circumference of the reciprocating rod.

FIG. 3 shows a third embodiment, in which there is a helical groove 6 around the circumference of the reciprocating rod 2. This groove 6 causes the reciprocating rod 2 to additionally rotate about the central axis during its reciprocating stroke according to the helical shape of the groove 6. This additional rotation also additionally rotates the round slide 1. As a result, overall, the rotating disk 5 of the round slide 1 covers a larger angle of rotation than when the guide groove 6 is axis parallel. The angle of rotation is dependent in this case on the lead of the helix of the guide groove 6. Given a suitable lead, it is possible, for example, to achieve an angle of rotation of the rotating slide 1 which is twice as large or greater. The helical guide groove 6 can be used both in the embodiment of FIG. 1 and in that of FIG. 2. Correspondingly, it is also possible to use the guide elements, such as profiled edges, etc., named as alternatives to FIG. 1.

Figure 4:
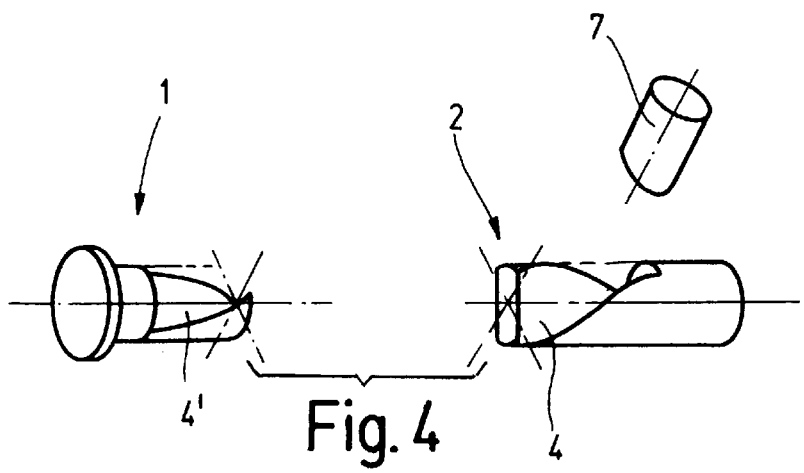
FIG. 4 shows a fourth embodiment, in which the reciprocating rod is constructed with an essentially rectangular cross section and its surface is wound helically around the central axis.

FIG. 4 shows a fourth embodiment for a smaller screw mechanism as an example. Instead of having the guide groove 6, the reciprocating rod 2 has an essentially rectangular cross-sectional surface including an outer side on which the guide element 7 slides. Visible on the inside is the guide surface 4 on which the corresponding guide surface 4' of the round slide 1 slides.

Figure 5:
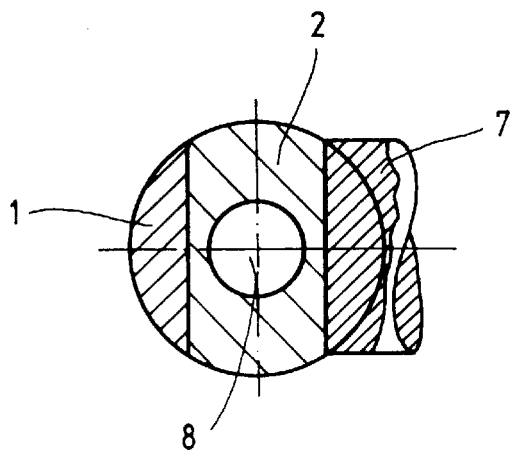
FIG. 5 shows the fourth embodiment in cross section with a guide element.

FIG. 5 shows a cross section of the arrangement in FIG. 4. The reciprocating rod 2 is seen in the central region of FIG. 5. For example, it has a central bore 8. On the left hand side of FIG. 5 there is a round slide 1 having a sliding surface that bears against the sliding surface of the reciprocating rod 2. The guide element 7 is on the right-hand side of FIG. 5 and bears against the other side of the sliding surface. The rectangular cross-sectional surface of the reciprocating rod 2 is likewise constructed helically, as may better be seen in FIG. 4.

Figure 6:
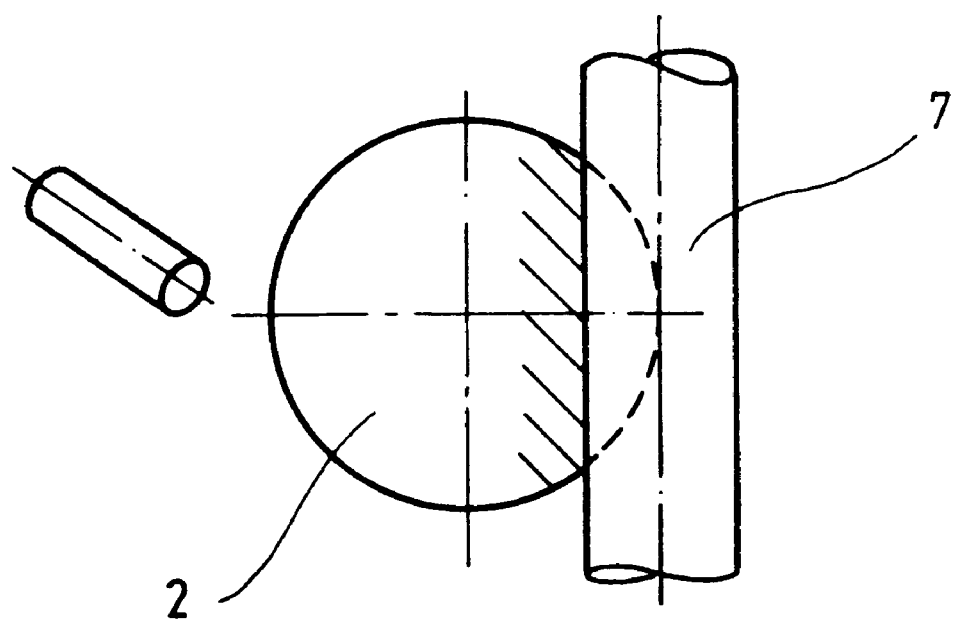
FIG. 6 shows a fifth exemplary embodiment in cross section, wherein the guide element is constructed as a pin with linear contact.

FIG. 6 shows a fifth embodiment in cross section. Here the guide element 7 is constructed as a pin providing linear contact. The pin extends offset, and preferably transverse to the central axis of the reciprocating rod 2. It touches the reciprocating rod 2 in the region of a flat on the rod, thus reliably avoiding rotation of the reciprocating rod 2 about its central axis, as in the embodiment of FIG. 1. Such a screw mechanism can be finished completely as a cartridge and be used, for example, as a multiple screw mechanism in a tool.

Figure 7:
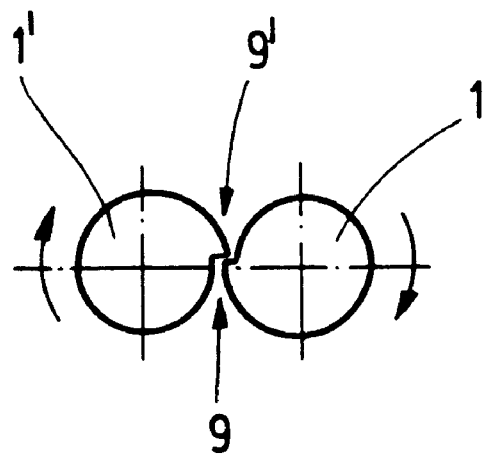
FIG. 7 shows a sixth embodiment with two oppositely rotating round slides whose angles of rotation are limited by pins.

FIG. 7 shows a sixth embodiment of a screw mechanism with two screw mechanisms which are arranged next to one another and for which the directions of rotation are opposite, as indicated by the opposing arrows. Two round slides 1 and 1' are represented in cross section. Each round slide has a respective pin 9, 9'. The two pins are constructed so that they strike against one another during opposing revolutions of the two round slides 1, 1', and this limits their angles of rotation. To effect such placement and engagement between the adjacent screw mechanisms, they are retained axis parallel in a housing that holds them together.

Figure 8:
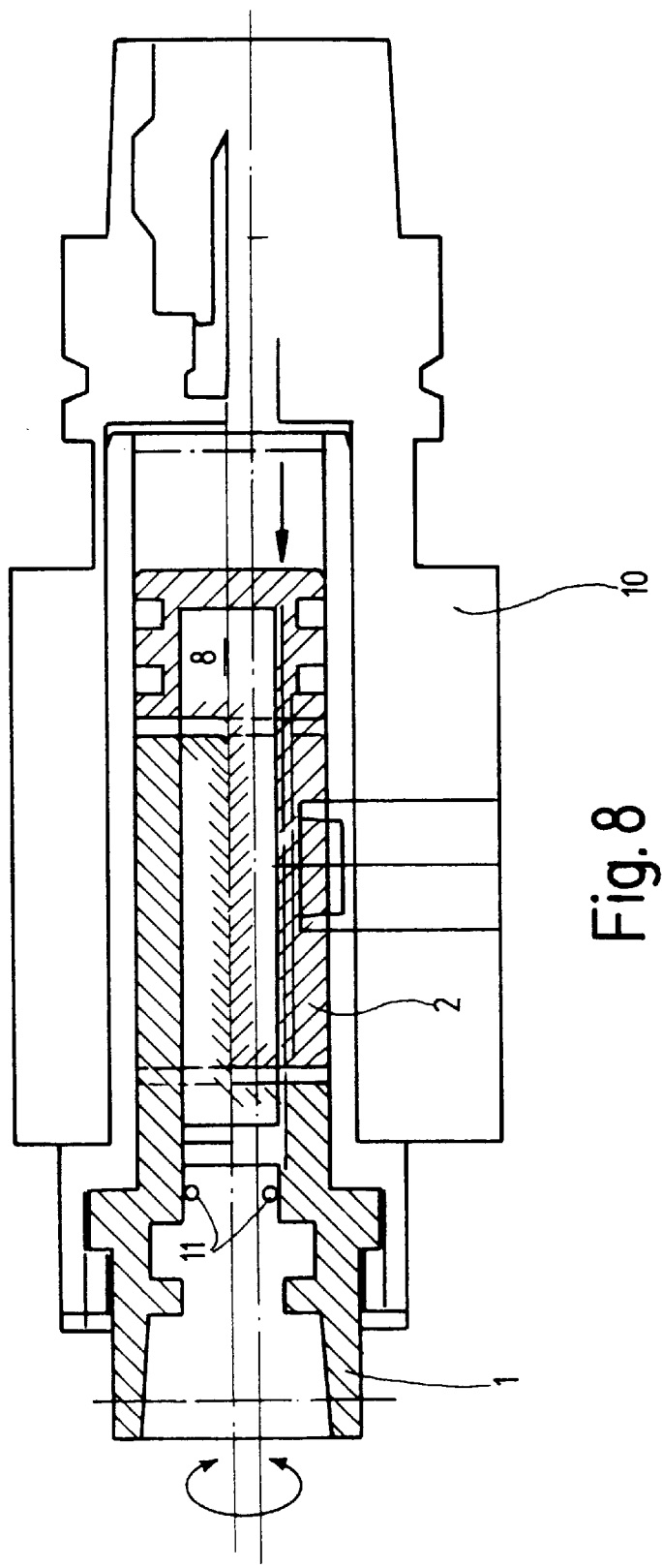
FIG. 8 shows a seventh embodiment in cross section with a spring in the central bore.

FIG. 8 shows a seventh embodiment of a screw mechanism in longitudinal section, in which the reciprocating rod 2 and the round slide 1 are inserted into a sleeve 10. Instead of the sleeve 10, it is also possible to provide a corresponding bore, for example in a tool. The central bore 8 into which a spring 11 is inserted is also seen. The spring 11 is constructed in this case as a return spring and supports the alternating rotary movement of the round slide 1. On the other hand, the spring 11 also serves to hold together the two parts comprised of the reciprocating rod 2 and round slide 1.

The screw mechanism is of universal construction, in that it can be used for different applications and types of drive. For example, the reciprocating rod 2 can be in the form of a piston in a pressure cylinder. An alternative refinement of the screw mechanism is to fasten the reciprocating rod 2 centrally or eccentrically on a piston by means of a further rod and to drive it with the piston. It is possible in this way to arrange a plurality of round slides in a single tool within a very restricted space and to drive them mechanically. Since the round slide 1 is also designed with its rotating disk 5 for universal use, this advantageously provides a screw mechanism which can be used in many ways.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A screw mechanism including a shaft to be guided so that reciprocating movement of the shaft is converted into rotary movement around an axis and at the output of the screw mechanism, the shaft comprising a reciprocating rod and a rotatable slide, the rod and slide being aligned axially and each having an axially inwardly facing end region and an opposite outwardly facing end;

each of the inwardly facing end regions of the rod and the slide has an axially extending guide surface, the guide surfaces are complementary helically shaped and extend in the axial direction and are so matched to one another as to engage such that reciprocation of the rod causes rotation of the slide around the axis due to the engagement of the helical guide surfaces;

an axial abutment on the slide for restricting reciprocating movement of the slide while permitting rotary movement thereof around the axis.

2. The screw mechanism of claim 1, further comprising a guiding mechanism for converting reciprocating motion of the shaft into rotary motion thereof.

3. The screw mechanism of claim 2, wherein the guiding mechanism comprises a sleeve around the screw mechanism guiding the rod to reciprocate and the slide to rotate.

4. The screw mechanism of claim 1, wherein the guiding mechanism further comprises a guide element engaging the reciprocating rod and which guides the reciprocating motion.

5. The screw mechanism of claim 4, further comprising a cooperating element on the reciprocating rod for engaging the guide element so that as the rod reciprocates, the cooperation between the guide element and the cooperating element controls rotation of the rod with respect to rotation of the slide.

6. The screw mechanism of claim 5, wherein the guide element for guiding the reciprocating rod comprises a projection, and the cooperating element on the reciprocating rod which engages the guide element comprises a groove in or a profiled edge on and extending axially along the rod.

7. The screw mechanism of claim 6, wherein the groove or the profiled edge extends parallel to the axial direction of the rod.

8. The screw mechanism of claim 6, wherein the groove or the profiled edge extends helically along and axially along the circumference of the rod.

9. The screw mechanism of claim 6, wherein the guide surface on the reciprocating rod extends along an axial region thereof and the cooperating element on the rod is axially along the rod at the same axial region as the guide surface.

10. The screw mechanism of claim 2, wherein both the reciprocating rod and the slide have respective aligned axial bores therethrough.

11. The screw mechanism of claim 10, further comprising a guide rod arranged in and extending along the axial bores of the rod and the slide.

12. The screw mechanism of claim 11, further comprising a return spring in the axial bore.

13. The screw mechanism of claim 10, further comprising a return spring in the axial bore.

14. The screw mechanism of claim 2, wherein the reciprocating rod comprises a piston of a pressure cylinder arrangement.

15. The screw mechanism of claim 2, further comprising a rod for aiding in reciprocating movement of the rod of the screw mechanism.

16. The screw mechanism of claim 2, further comprising at least two of the screw mechanisms arranged axially parallel next to each other and including means for engaging each other.

17. The screw mechanism of claim 16, wherein the rotation directions of the two neighboring screw mechanisms are opposite each other, whereby they can be rotated into engagement.

18. The screw mechanism of claim 16, wherein the slides of the respective screw mechanisms each include a pin which extends into engagement with the pin of the other of the slides at a particular respective angle of rotation for limiting the angles of rotation of the slides by reciprocal stopping.

* * * * *